United States Patent [19]

Houston et al.

[11] Patent Number: 5,392,213
[45] Date of Patent: Feb. 21, 1995

[54] FILTER FOR REMOVAL OF COHERENT NOISE FROM SEISMIC DATA

[75] Inventors: Louis M. Houston; John R. Potter, both of Houston, Tex.

[73] Assignee: Exxon Production Research Company, Houston, Tex.

[21] Appl. No.: 965,598

[22] Filed: Oct. 23, 1992

[51] Int. Cl.⁶ .................................. G01V 1/36
[52] U.S. Cl. ........................ 364/421; 367/124; 367/126; 367/40
[58] Field of Search ............... 324/323, 337; 364/420, 364/421; 367/124, 126, 40, 25, 51, 52, 59, 63

[56] References Cited

U.S. PATENT DOCUMENTS

| | | | |
|---|---|---|---|
| 2,473,469 | 6/1949 | Dahm | 177/352 |
| 2,872,996 | 2/1959 | Runge | 181/5 |
| 2,897,477 | 7/1959 | Lindsey | 340/15 |
| 4,203,161 | 5/1980 | Johnson et al. | 367/40 |
| 4,204,279 | 5/1980 | Parrack et al. | 367/40 |
| 4,323,876 | 4/1982 | Parrack et al. | 367/40 |
| 4,344,158 | 8/1982 | Landrum, Jr. et al. | 367/73 |
| 4,397,006 | 8/1983 | Galbraith, Jr. | 367/40 |
| 4,813,027 | 3/1989 | Tieman | 367/52 |
| 4,829,487 | 5/1989 | Malloy | 367/40 |
| 4,860,265 | 8/1989 | Laster et al. | 367/73 |
| 4,953,138 | 8/1990 | Ratcliff | 367/43 |
| 4,992,995 | 2/1991 | Favret | 367/43 |
| 5,067,112 | 11/1991 | Meek et al. | 367/43 |
| 5,191,526 | 3/1993 | Laster et al. | 364/421 |

*Primary Examiner*—Gail O. Hayes
*Assistant Examiner*—Stephen R. Tkacs
*Attorney, Agent, or Firm*—Susan A. McLean; Keith A. Bell

[57] ABSTRACT

A method for suppressing or removing coherent noise from seismic or borehole data is disclosed. The method requires horizontal alignment of the traces, comparison of the amplitude, phase and/or shape of neighboring traces, and subtraction of traces from neighboring traces only where the local correlation is high.

22 Claims, 9 Drawing Sheets

True Amplitude Gather after Median filter
(19 dB tube wave reduction)

Crosshole Recording Geometry

FILTER FOR REMOVAL OF COHERENT NOISE FROM SEISMIC DATA

FIELD OF THE INVENTION

This invention relates generally to algorithmic methods of attenuation or removal of coherent noise, such as multiple reflections from reflection seismograms in the area of seismic data processing. It is equally applicable to attenuation or removal of coherent noise, including tube waves, in borehole seismic applications.

BACKGROUND OF THE INVENTION

In seismic data gathering, it is conventional to position a plurality of seismic receivers along the surface of the earth above the formation of interest at locations spaced by a determinable distance. Alternatively, these receivers may be placed downhole.

A plurality of seismic sources disposed at spaced locations on the earth's surface or downhole can then be activated to generate seismic waves which propagate outwardly in all directions. Vibrating devices, explosives, and impulsive devices are examples of some seismic sources. The seismic waves generated by these sources are reflected, refracted and diffracted by interfaces within the formation, and some of these diverted seismic waves are detected by the plurality of seismic receivers and can be processed as seismic signals. Each such receiver receives a signal, which is then recorded. The signals received by a receiver and then recorded are collectively called a trace. Each trace is comprised of more than one wavelet. The collection of recorded traces is referred to herein as "unfiltered seismic data." Such seismic traces can be displayed as seismic sections which contain information about the time, duration and intensity of the diverted seismic waves. The seismic sections can be studied to extrapolate information regarding the type and location of subsurface formations producing the seismic signals. This information can then be used to evaluate the subsurface formations for petroleum-bearing properties.

Seismic energy which has generally been reflected only once from a reflecting interface is referred to in the art as a "primary"; similarly, that which has been reflected more than once is referred to in the art as a "multiple." Such reverberating seismic energy can produce multiples for one or more reflecting interfaces in the earth. The presence of multiples in the seismic data can result in confusing and possibly non-interpretable data where the multiples mask underlying primary reflections. Water bottom multiples and multiple reflections often destructively interfere with the primary reflections of interest. Accordingly, the art has developed various methods of attenuating or removing the multiples, with a goal of minimizing the distortion of the underlying primaries.

There are various standard techniques in the art for removing these multiples from unfiltered seismic data. These standard techniques can be classified into four general categories: common mid point ("CMP" or common depth point or CDP) stacking, model-based filters, predictive deconvolution and velocity filters. As is known in the art, the term "filter" means a method for removing seismic noise, generally via an algorithm. CMP stacking is also a velocity filter, but requires only general velocity information. Most velocity filters require specific velocity information.

Probably the simplest and most popular multiple suppression method used is CMP stacking. Since multiples tend to have different velocities from primaries, normal-moveout correction of the primaries causes stacking to reduce statistically the relative amplitude of the multiples. Weighting the amplitudes of the data prior to stack can improve the multiple reduction. This method is called linear-weighted stacking. It causes a relative amplitude reduction in the near-offset traces prior to stack. Since near-offset trace multiples are the primary contaminant in the stacked section, linear weighted stacking produces strong multiple suppression. Unfortunately, this method also suppresses or alters primary amplitudes.

Similar results occur for the progenitor of linear weighted stacking, which is called near-offset trace muting. In this method, near-offset amplitudes are completely removed. This can obviously strongly suppress or eliminate primary events.

Model-based filters attempt to remove the effect of surface reflections which cause multiples by mathematically removing these surfaces from the data. These filters are based upon the wave equation and can be expensive and difficult to use.

Predictive deconvolution is a method typically used to suppress short-period multiples. This deconvolution uses uniform periodicity to predict and remove multiples. The method is less successful, however, on medium to long-period multiples because of loss of uniformity. That is, with each consecutive repetition of the primary signal (multiple), the shape of the curve defined by the corresponding wavelet in the traces distorts slightly. Thus, the farther in time a given multiple is detected after the primary signal, the less like the original signal it will appear.

Out of the many different types of velocity filters, the f-k filter is one of the most common. It transforms data into a space in which events are separated based on velocity and removes unwanted events. It requires only specific velocity information in order to function. In contrast to predictive deconvolution, the f-k filter can be highly effective in suppressing long-period multiples, but less effective with medium and short-period multiples. This is due to the decreasing velocity separation between multiples and primaries as the multiple period shortens.

Some of the most effective velocity filters not only require specific velocity information, but perform some statistical measurement on the data. They derive a statistical estimate of the multiples which is then subtracted from the unfiltered data. An example of a commonly used statistical velocity filter is the median filter. Most velocity filters of this type strongly attenuate multiples, but distort primary events.

The method of this invention is most similar to median filtering, which is one of the most commonly used time-domain techniques for suppressing coherent noise. To implement this method, the seismic or borehole data is first horizontally aligned. The median filter is applied along the space axis. The waves are smoothed and emphasized, while other events are attenuated. After removing the horizontal alignment, the median filtered data are then subtracted, on a trace by trace basis, from the unfiltered data. The result is a rejection of multiples. Median filtering was first used in the area of speech processing. It removes amplitude spikes without destroying rapid changes in information. This effectively smoothes images without affecting resolution. The median value of n statistical data is defined as the sample in the (n+1)/2 position of the sequence when the data are arranged in ascending order of magnitude. The median filter rejects spikes and passes step functions.

The tau-p filter, another type of velocity filter, is similar to the f-k filter and yields similar results. These filters transform the data into a space in which events are separated based on velocity. They require only specific velocity information in order to function.

A combination of methods can also be effective and is often used. For instance, f-k filtering often does not remove multiples on the near-offset traces, so a near-offset trace mute or linear weighting can be run after the f-k filter.

Although multiples usually have different velocities from the primary reflections, their moveout is often non-hyperbolic. The amplitude and frequency content of such events may also vary with offset. Such non-uniform behavior can make these events difficult to filter from data without distorting or suppressing primary reflections. In fact, it is both non-uniformity and non-locality which inhibit most of the standard multiple filters. Because these filters take a global approach, they encounter more non-uniformity and are less likely to attenuate the multiples. On the other hand, those filters which take both a global and a local approach, such as median filters, do well in attenuating the multiples, but tend to distort the primary events. Filters of the latter type have the proper approach, but not the mechanism needed to adequately discriminate between multiple and primary events.

The filter of this invention addresses this problem by using a statistical operator to turn the filter on and off. After the multiples have been horizontally aligned as much as possible, the operator measures both the amplitude and character of neighboring wavelets to determine whether they are multiples. Once the multiples are located, the filter attenuates them by subtracting neighboring wavelets within a moving space-time window. This filter strongly attenuates multiples while avoiding primary events. It does this by removing neighboring, horizontally coherent events and is applied to pre-stack seismic data which is either common midpoint ordered or shot ordered.

It is an object of this invention to provide a filter which effectively removes or attenuates coherent noise from seismic or borehole data so that underlying primary signals may be viewed.

It is a further object of this invention to remove or attenuate such multiples with minimal distortion of primary signals.

It is a further object of this invention to provide a method for filtering multiples which allows a decision to be made whether or not to subtract wavelets based upon the similarity of the horizontally aligned wavelets.

Other objects of this invention will be apparent to one skilled in the art from review of the specification, figures and claims herein.

SUMMARY OF THE INVENTION

A method for removing or attenuating coherent noise from seismic or borehole data is presented. This method comprises:

1. Horizontally aligning the coherent noise using methods known to those skilled in the art of seismic data processing.
2. Dividing the seismic or borehole data into a plurality of time windows, each for separate consideration, where each time window contains at least one data point, and which time windows are not necessarily uniform in period of time covered.
3. Dividing each time window into a plurality of space-time windows.
4. For each space-time window, comparing the characteristics, where characteristics consist of phase, amplitude or shape, or any combination thereof, of wavelets on two neighboring traces to determine the degree of similarity of said wavelets, and comparing said degree of similarity to a predetermined desired value thereof. For the purpose of this invention and by way of example, traces one and two are adjacent traces; traces one and five are local but non-adjacent traces, and all three are neighboring traces; that is, the set of all adjacent traces and the set of all local but non-adjacent traces together make up the complete set of neighboring traces.
5. Where said degree of similarity is at least equal to or greater than the predetermined desired value thereof, meaning said neighboring wavelets are reasonably similar for a given signal, subtracting the wavelet from one trace within said space-time window from the corresponding wavelet on a neighboring trace in said space time window. Where said degree of similarity between said two neighboring traces is less than the predetermined desired value thereof, meaning said local but non-adjacent traces are not reasonably similar for a given signal, doing no such subtraction.
6. Repeating steps 4 and 5 for each space-time window within said time window, until the wavelet on the last trace has been compared to the corresponding wavelet on a neighboring trace.
7. Repeating steps 3 through 6 for each time window.
8. Removing the horizontal alignment.
9. Using the resulting filtered data to ascertain information regarding a subterranean formation or formations.

DETAILED DESCRIPTION OF THE INVENTION

There are various undesired seismic events which have nearly-linear or nearly-hyperbolic moveout. The amplitude and frequency content of such events may also vary with offset. These events are often difficult to filter from data because of their non-uniform behavior.

The filter of this invention is a time-domain notch filter that attenuates or removes coherent noise which has been flattened by horizontal alignment. It operates only in local regions of the seismic or borehole data in which the undesired events appear more uniform. Assuming the undesired events or noise have been horizontally aligned as much as possible, suppression is obtained by subtracting neighboring wavelets only within the space-time window containing the noise. As will be exceedingly well known to persons of ordinary skill in the art of seismic data processing, filters such as the present invention are very typically implemented through use of a computer.

The filter determines whether a specific window contains signal or noise by measuring the zero-lag cross-correlation between local traces within the window. Assuming the noise has been aligned within the window, it should be highly correlated, whereas the signal should not.

In the preferred embodiment of this invention, the time windows are non-overlapping, the space-time windows are overlapping, comparison is between two local but non-adjacent traces, and subtraction is between two adjacent traces.

Figure 1:
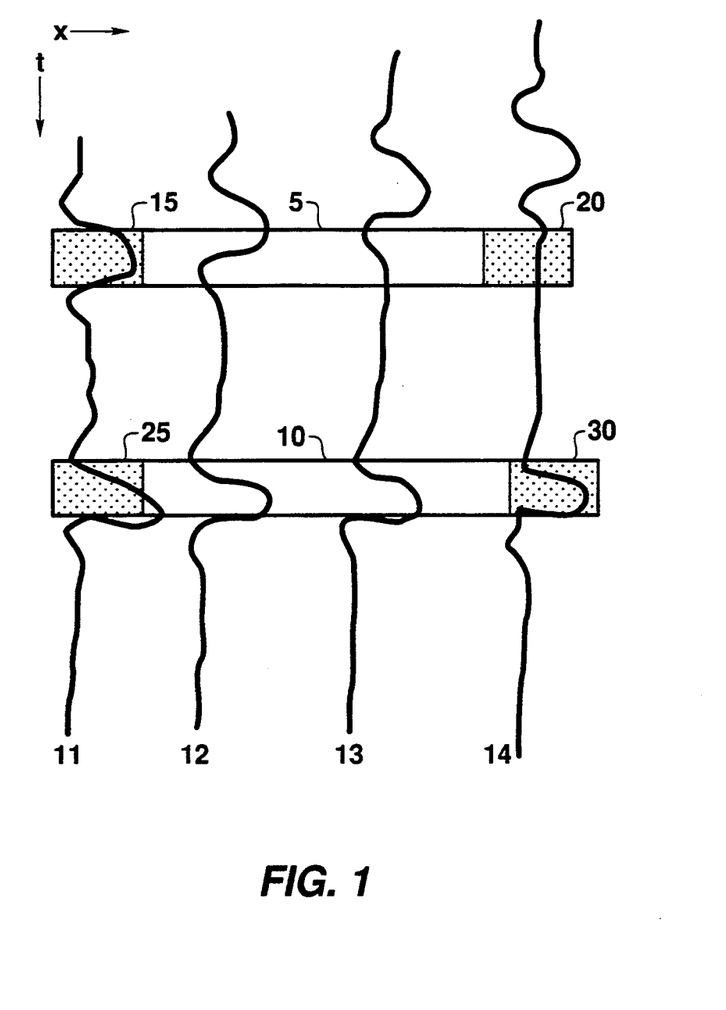
FIG. 1 is a sketch of four traces showing two signals, one with similar wavelets and one with dissimilar wavelets.

Referring to FIG. 1 will aid in understanding the concept of this invention. FIG. 1 is a rendering of a small window of horizontally aligned hypothetical data wherein lines 11, 12, 13 and 14 are sequential traces, space-time windows 5 and 50 are outlined for ease of reference, and regions 15, 20, 25, and 30 correspond to areas on the traces 11, 12, 13 and 14, which areas are to be compared. The filter of this invention would compare region 15 to region 20 in determining whether or not to subtract that portion of trace 14 within window 5 from that portion of trace 13 within window 5. Because the content of region 15 is very different from that of region 20, no such subtraction would take place. However, comparison of the content of region 25 to that of region 30 would result in a finding of a strong correlation. Accordingly, application of the filter of this invention would result in that portion of trace 14 within window 10 being subtracted from that portion of trace 13 within window 10.

The filter is a modification of a spatial finite difference operator. This is an approximation to a spatial derivative which is a strong notch filter for horizontal events. It is also a local operator and therefore functions on small, horizontally uniform regions of the data. By using a measure of coherence in a local area, this modification of the finite difference filter is restricted to regions containing undesired events. This modification makes the filter non-linear and minimizes the distortion to primary signal.

The methodology for the local coherence filter is straightforward. After the data have been horizontally corrected to align the undesired events, or coherent noise, the data are broken into several small, preferably non-overlapping, time windows. Each time window is then further divided into a set number, as set forth later, of preferably overlapping space-time windows, and a normalized, zero-lag cross-correlation is calculated for each space-time window sequentially. After the correlation term is calculated using neighboring, preferably non-adjacent traces for a given time window, a decision is made mathematically whether or not to subtract neighboring, preferably adjacent, traces within that space-time window. The process is then repeated with the next time window in the set. A given seismic trace is described by the following notation:

$z_j(t)$ = amplitude of signal at trace j, time t.

If the data have been corrected to horizontally align the coherent noise the filter of this invention can be denoted by $$\tilde{z}_j(t_p) = z_j(t_p) - \theta(c_k - c_T)z_j + 1(t_p)$$

where $\tilde{z}_j(t_p)$ represents the modified amplitude of trace j at time $t_p$ $z_j(t_p)$ is the unmodified amplitude of trace j at time p;

$\theta(x)$ is the unit step function. The step function is given by $\theta(x) = 1, x > 0$ or $x = 0$  $\theta(x) = 0, x < 0$ $c_k$ is the normalized, space-time-windowed, zero-lag cross-correlation term. This number measures the similarity of neighboring signals over a specified space-time window. The correlation term, $c_k$, is determined over preferably non-overlapping time windows ($t_1$ to $t_2$, $t_2$ to $t_3$, etc.) within preferably overlapping space-time windows and is given by the following equation:

$$c_k = \frac{2 \sum_{t=t_1}^{t_2} z_j(t) z_{j+m}(t)}{\sum_{t=t_1}^{t_2} z_j^2(t) + \sum_{t=t_1}^{t_2} z_{j+m}^2(t)}$$

the correlation threshold, $c_T$, is the number at or above which indicates the presence of neighboring coherent noise; and the trace index m is some small integer chosen such that j and j+m indicate preferably non-adjacent, but local, traces. The actual value of m depends on the data; an optimal value may be selected by trial and error, but preferably the value is between 2 and about 8. Note that the number of space-time windows is preferably identical for each time window within a given data set, and that the maximum number of such time windows is given by the total number of traces, minus m.

The correlation term $c_k$ estimates whether there is coherent noise or desired signal within a given time-window and the step function, $\theta$, allows or inhibits subtraction, accordingly. While the cross-correlation term is preferably calculated using local, but non-adjacent traces (e.g., trace 1 and trace 5), the subtraction is preferably performed with adjacent traces (e.g., trace 1 and trace 2). This improves the discrimination of the filter while maximizing its attenuation or removal strength. There are two basic assumptions behind the filter. One is that only the coherent noise will be correlated upon horizontal alignment. This is equivalent to assuming that some velocity separation exists between the coherent noise and desired events. The other assumption is that most coherent seismic or borehole energy is smoothly varying. This implies that neighboring wavelets along an event horizon should be extremely similar in characteristics such as amplitude, phase and shape.

The range of $c_k$ is given by $$-1 \leq c_k \leq 1$$

Based on this equation, a nominal threshold value for $c_T$ might be 0.7, but this value, like that of m, is also data dependent.

There are three basic underlying principles of the filter of this invention. The first is that the filter is turned on or off based on the cross-correlation value. This allows it to filter only the coherent noise. This feature distinguishes this filter from all other filters in the related art.

The second principle is that the difference in velocity of the coherent noise and primary energy is maximized by cross-correlating non-adjacent, but local, traces. This improves the discrimination of the filter and allows it to perform where other velocity filters would probably fail.

The third principle is that the cross-correlation can be performed in a time-window, rather than with a single point. This improves the discrimination by allowing it to compare amplitude, shape and phase of the wavelets.

A variation of this method replaces the step function $\theta$ with a smoothing function such as:

$$\tilde{\theta}(c_k) = \frac{1 + \tanh(a(c_k - c_T))}{2}$$

where a is a nonnegative constant. Other smoothing functions could easily be suggested by those skilled in the art. This variation differs from the principle invention in that, while the principle invention allows a choice as to whether or not to subtract neighboring traces, (because $\theta$ will at times be zero) the use of this variation always yields a subtraction of some portion of a trace from its neighboring trace. However, some data are better filtered using this approach. Again, the decision of whether or not to use this variation is data-dependent.

As stated earlier, the filter of this invention is effective not only for tube-wave and other coherent noise suppression, but also for attenuation or removal of multiples from seismic data. As with most other velocity filters, the multiples must be flattened or normal moveout (NMO) corrected prior to applying the filter of this invention. This is an important step no matter which velocity filter is being used because the flatter the multiples, the more effective the filter will be in removing them. This step is often over-simplified by using the water velocity to NMO-correct the multiples, but a much better method is to actually perform velocity analysis. Not only will the water bottom multiple be flatter, but pegleg and interbedded multiples may be flattened as well, if their velocities do not differ too much from that of water. If the difference in velocity is too great to flatten all the multiples, then more than one pass of velocity analysis and filter application may be necessary.

Automatic gain control ("AGC"), or some other type of gain as would be know by those skilled in the art, should normally be applied after the filter of this invention, but before stack, to boost the amplitudes of any primary events that had been masked by multiples. After the multiples have been removed, AGC boosts the primaries so that they stack much better. If AGC is not applied, the stacked section will probably have a zone of weak amplitudes where the multiples have been removed.

Stacking velocity analysis should be performed after the filter of this invention and AGC. With the multiples removed, it is easier to pick primary velocities that will result in a better stacked section.

The stacked section using the filter of this invention may have some high frequency background noise. This is the result of the filter's step equation which may cause abrupt pulse changes. A simple high-cut bandpass filter will attenuate or remove this unwanted noise.

The filter of this invention has both a global and a local approach. During preprocessing, it uses global velocity information to horizontally align the multiples. It then operates locally, processing only small portions of the data during each iteration. The filter maximizes velocity differences between primaries and multiples by comparing local wavelets from preferably non-adjacent traces. Thus, it can use local velocity changes to discriminate between primary and multiple events in order to remove only the multiples. Once a multiple is identified, the filter uses subtraction of neighboring (preferably adjacent) traces to get maximum attenuation. Subtraction of neighboring traces, rather than zeroing the amplitude of the multiple wavelet, yields a smoother result and limits the potential removal of primary energy. Since this decision-making ability (i.e., mathematically deciding whether or not to subtract) allows it to process only the coherent noise, the filter has little effect on the rest of the data. This feature is the reason that primaries are minimally affected by the filter of this invention.

EXAMPLE 1

A seismic line from the Gulf of Mexico was chosen for the initial testing of the filter of this invention on field data. The line is located over a salt body in about 4500 feet of water and has at least three multiples that overlay and mask primary reflections.

Figure 2:
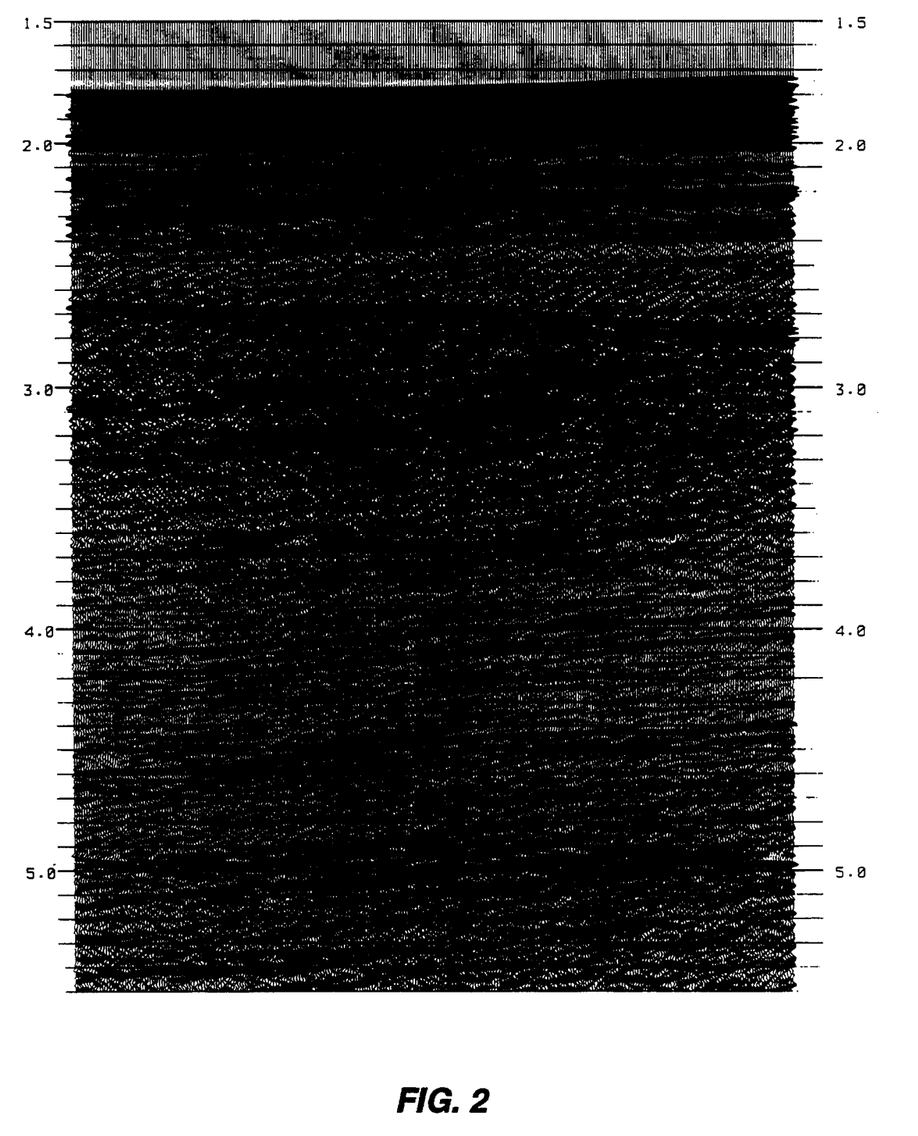
FIG. 2 is an example of actual unfiltered data discussed in EXAMPLE 1.

After normal moveout correction of most of the multiple events on the common depth point gathers from the seismic line, the filter of this invention was applied to each gather. The normal moveout corrections were then removed and the gathers were moveout corrected again with primary velocities. The data was then stacked and compared to a brute stack (without filtering). This is displayed in FIGS. 2, 3A and 3B which display 250 traces from the stacked sections. The brute stack in FIG. 2 contains both primary and multiple reflections. The geology shown by this data is a salt wedge between 2 and 3 seconds. The multiples occur at about 3.6 seconds, about 4.0 seconds, and about 4.6 seconds.

Figure 3A:
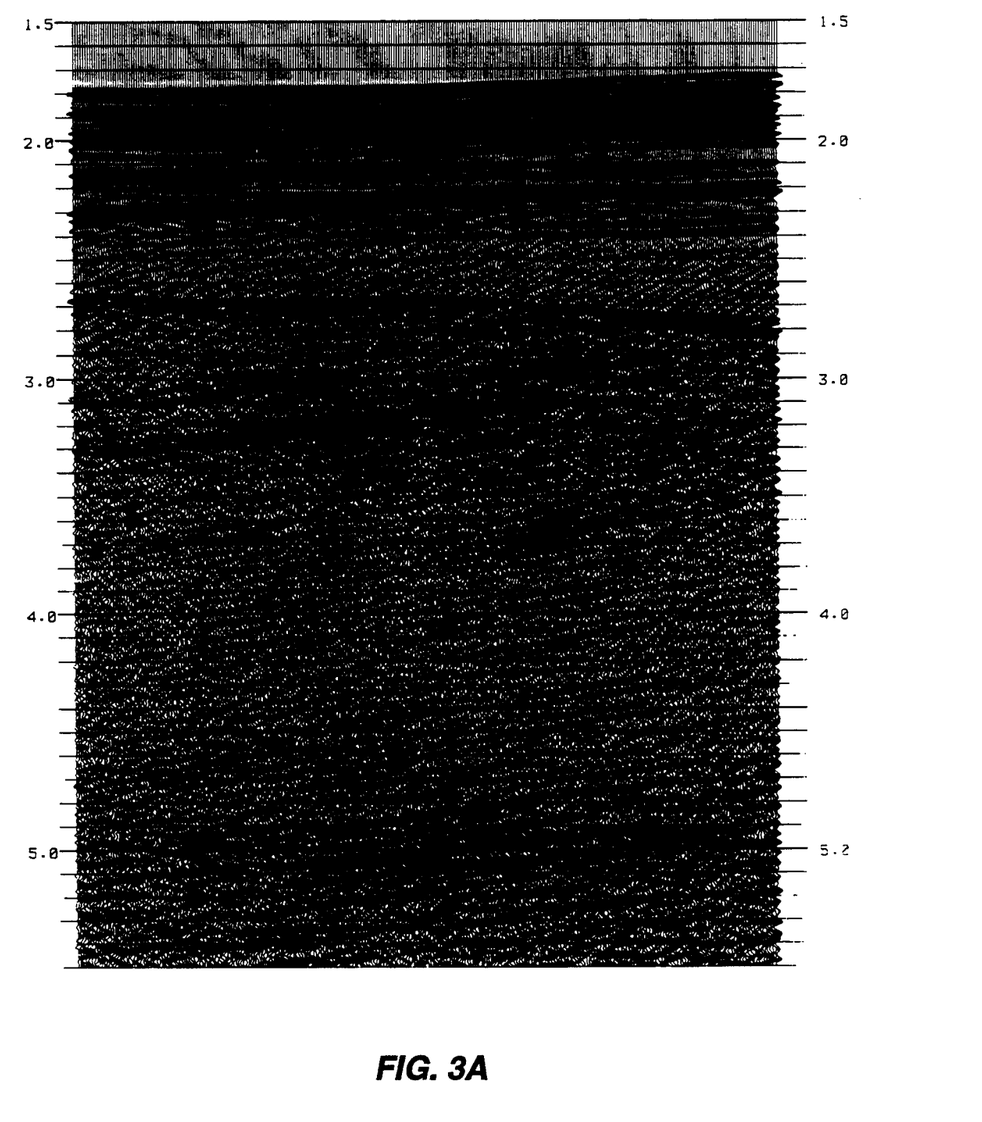
FIG. 3A shows the same data as in FIG. 2, said data having been filtered using the filter of this invention.

The stacked section after the filter of this invention was applied is shown in FIG. 3A. The filtered data shown is devoid of multiples, but has brought out primary events below the salt wedge, which events were previously obscured by the presence of multiples. The processing sequence was the filter of this invention, AGC, stack, time-variant bandpass filtering, and time-variant scaling. The filter of this invention was highly effective in removing the multiples with little distortion of the primaries. In fact, the primaries that were originally masked by multiples became much more apparent after the filter was applied. Performing velocity analysis after the application of the filter of this invention and AGC would probably have improved the stacked section even more.

Figure 3B:
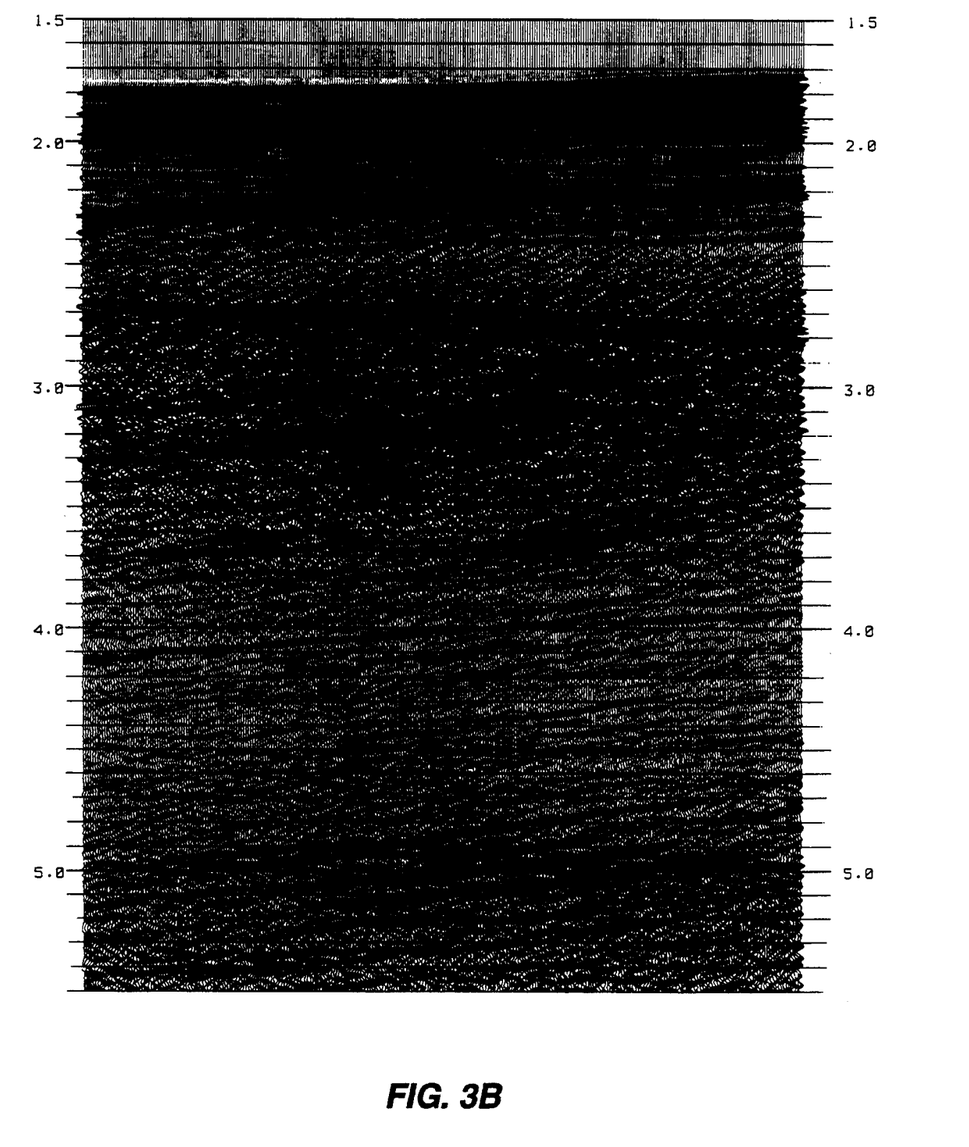
FIG. 3B shows the same data as in FIG. 2, said data having been filtered using an f-k filter.

The stacked section after f-k filtering was applied is shown in FIG. 3B. The processing sequence was f-k filter, AGC, stack, and time-variant scaling. The f-k filter was effective in attenuating the multiple at 3.6 seconds, less effective in attenuating the multiple at 4.6 seconds, and was ineffective in removing the multiple at 4.0 seconds. Primary reflections that were masked by multiples in the unfiltered stack can be seen more easily than on the brute stack, but not so clearly as on the section filtered by the filter of this invention. There is also some distortion of primary reflections.

EXAMPLE 2

Figure 4A:
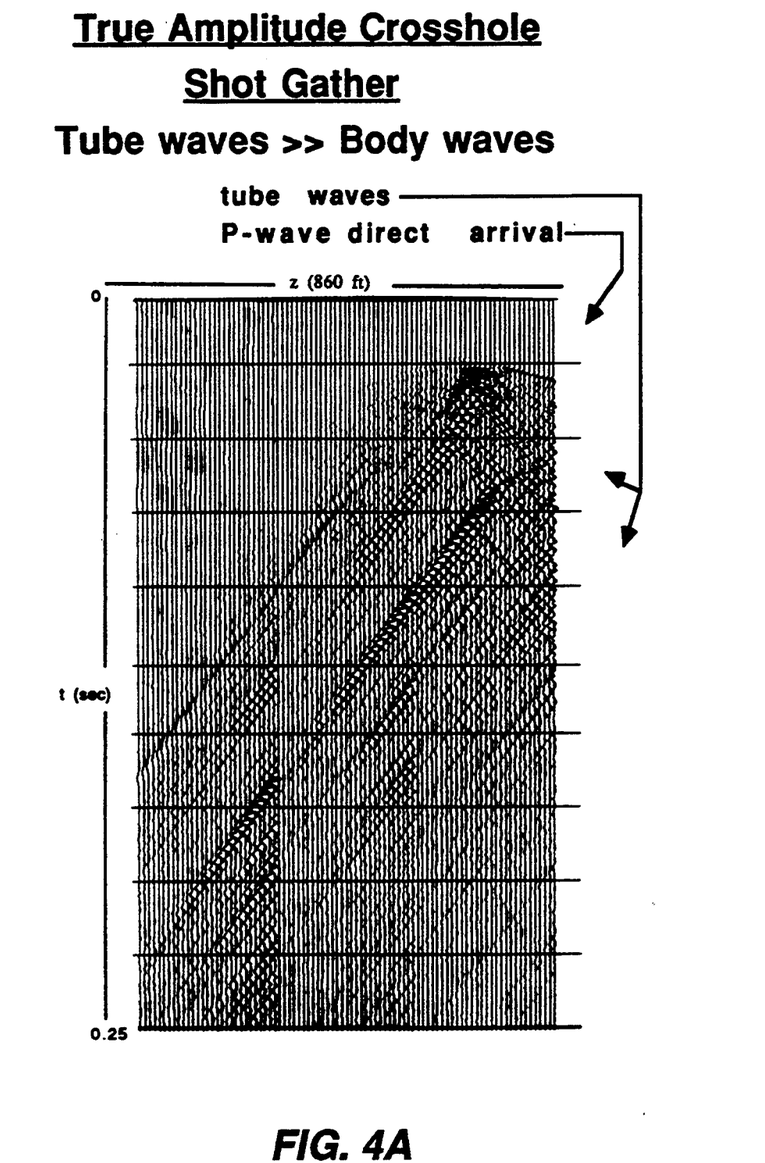
FIG. 4A shows data from a shot gather from Loudon Ill., as discussed in EXAMPLE 2.

A shot gather recorded at Loudon, Ill., contained significant tube wave energy since the gather was recorded with an analog hydrophone streamer 55. The tube wave amplitude dominated the direct arrival. See FIG. 4A for the overall data.

The tube wave energy travels up and down the borehole at a uniform velocity. For steel cased wells, as in this survey, the tube wave velocity is 4500 ft/sec, which can be confirmed by measuring the dip of the linear events in FIG. 4A.

Figure 5:
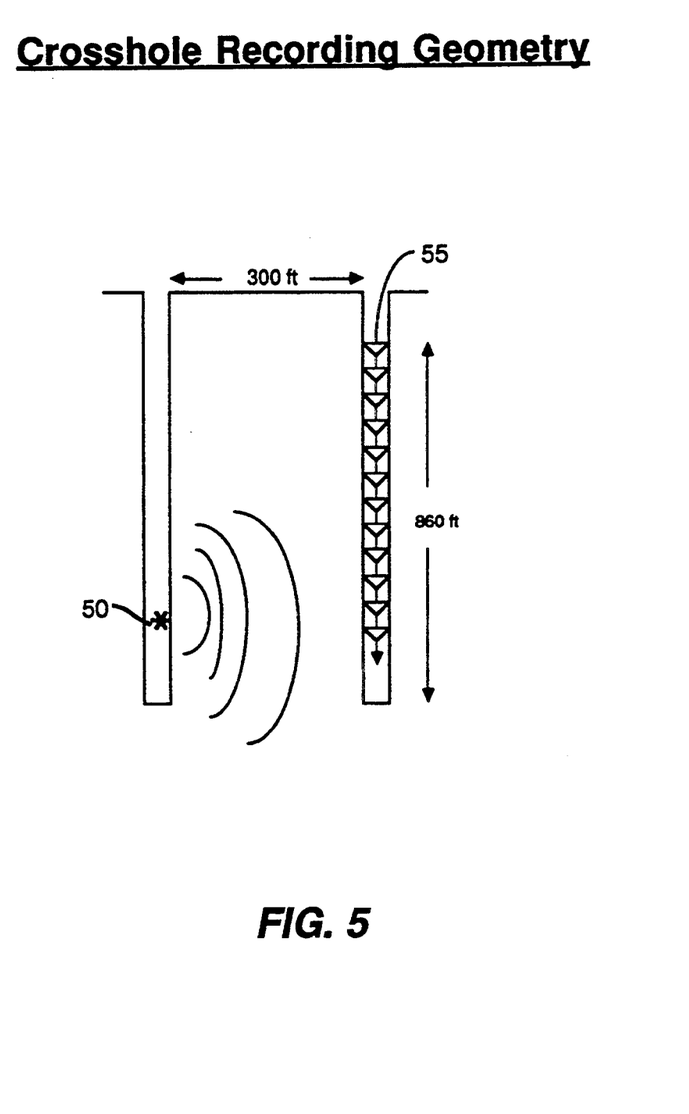
FIG. 5 shows the apparatus setup used to collect the data discussed in EXAMPLE 2.

The recording geometry for the gather is displayed in FIG. 5. The crosshole spacing is 300 feet. The shot (a downhole explosive source 50) was fired at separate times from a fixed position in one well while the streamer 55 was placed in different depths in the other well. In this survey, the streamer consisted of 29 channels and was moved three times, resulting in 87 traces. Since the hydrophones 55 were spaced at ten foot intervals, the gather spans 860 feet.

The banded appearance of the data is due to the way the gather was recorded, with different streamer positions. Since the streamer physically attenuates the tube wave energy, the tube wave amplitude decreases as it travels by the streamer.

Figure 4B:
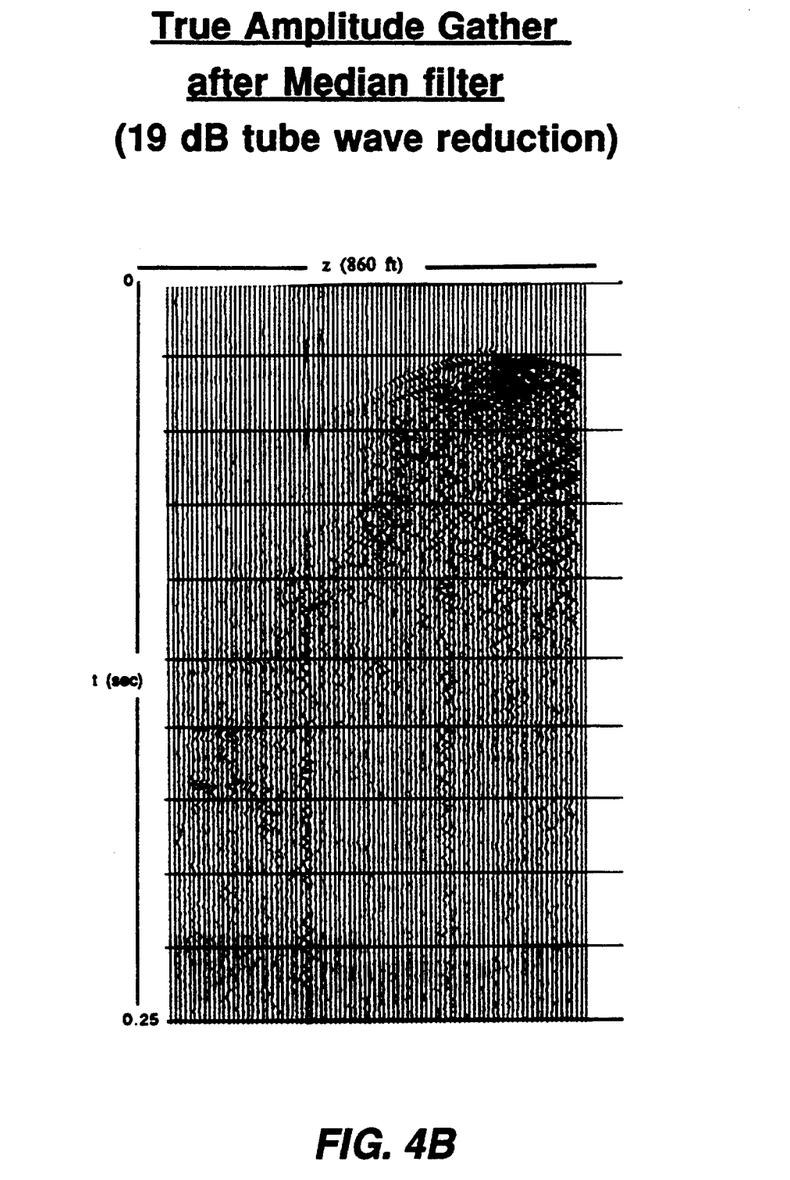
FIG. 4B shows the same data after a median filter was applied.
Figure 4C:
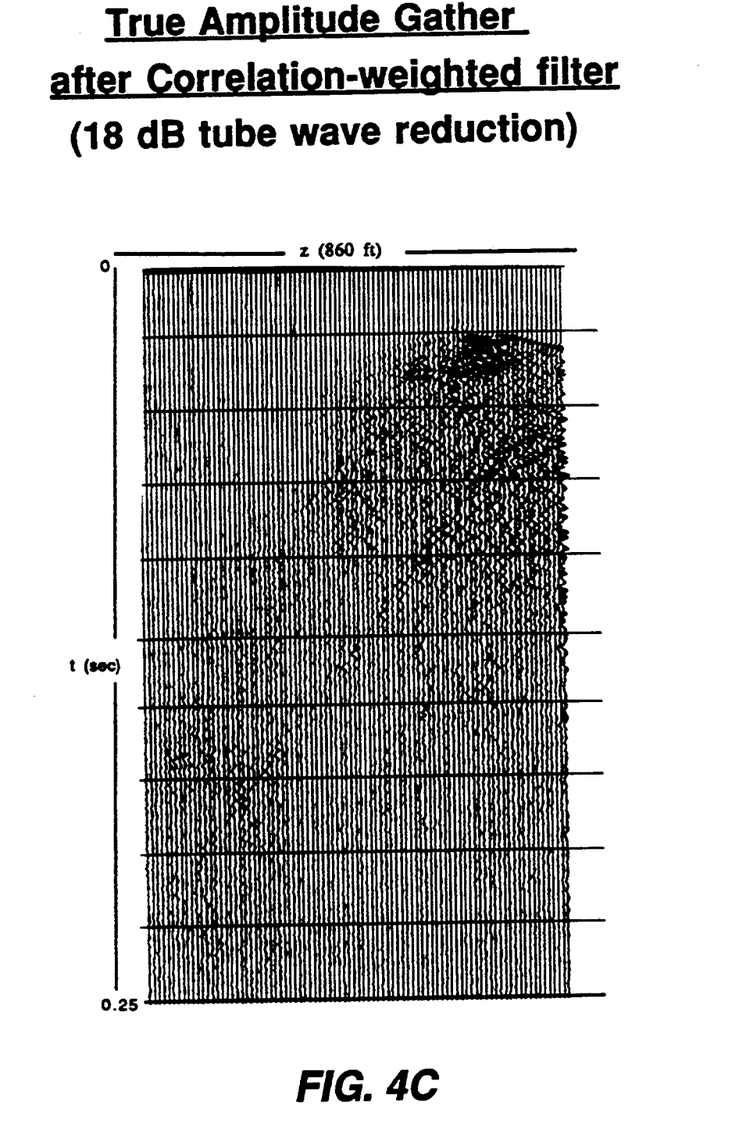
FIG. 4C shows the same data after the filter of this invention was applied.

In FIG. 4B, the data are shown after a five-trace median filter was applied to the tube waves, while FIG. 4C shows the data after a 20 time-point filter of this invention was applied. An optimum value for the correlation threshold was found by trial and error to be 0.4. Since the data were recorded with a ¼ ms time interval, there were 50 correlation windows in each ¼ sec of data. An additional benefit of the filter of this invention is that it is not affected by discontinuities in the traces, as is the median filter.

Peak amplitude measurements averaged over several traces yield near 9-to-1 or 19 dB tube wave attenuation using the median filter and near 8-to-1 or 18 dB attenuation using the filter of this invention.

Figure 6A:
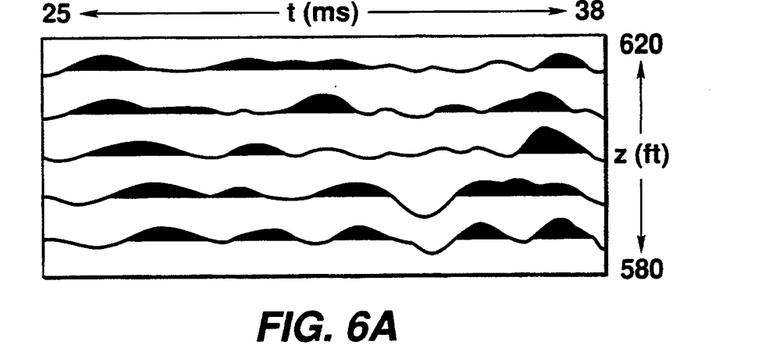
FIG. 6A shows a small portion of actual unfiltered data as discussed in EXAMPLE 2.
Figure 6B:
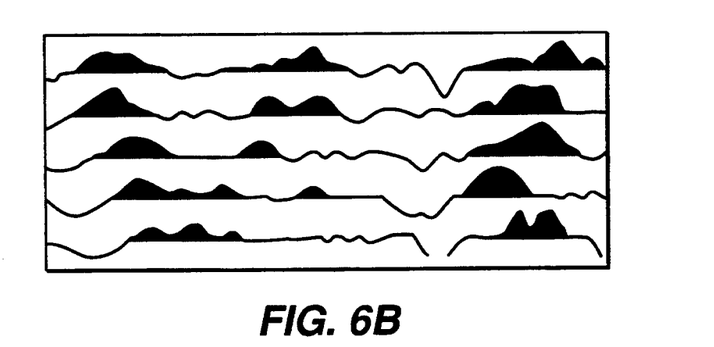
FIG. 6B shows the same data after being revised using the median filter, a technique commonly used in the art.
Figure 6C:
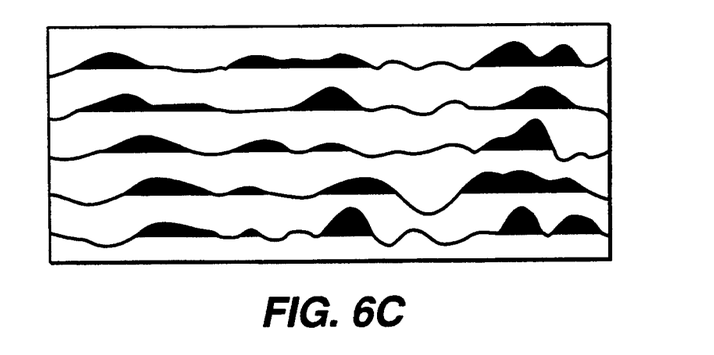
FIG. 6C shows the data of FIG. 6A after being revised by application of the filter of this invention. It can be seen by comparison that the filter of this invention does not distort the signal nearly as much as does the median filter.

The data is shown blown up in FIGS. 6A, 6B and 6C to show that the direct arrival information is clearly distorted by the median filter but not by the correlation-weighted filter. A comparison of wavelet shapes in the direct arrival indicates changes in amplitude and frequency content due to the median filter.

What is claimed is:

1. A computer-implemented method for attenuating coherent noise in a set of seismic data traces, said method comprising the steps of:

(a) preprocessing said data traces to substantially horizontally align said coherent noise;
   (b) dividing at least a portion of said data traces into a plurality of space-time windows containing segments of said data traces;
   (c) selecting a space-time window and performing a coherent noise attenuation procedure for said space-time window, said coherent noise attenuation procedure including the steps of
      (i) selecting a first data trace segment within said space-time window,
      (ii) determining the degree of similarity between said first data trace segment and a second data trace segment within said space-time window,
      (iii) comparing said degree of similarity to a predetermined threshold and either (A) if said degree of similarity is equal to or greater than said predetermined threshold, modifying said first data trace segment by subtracting a neighboring data trace segment within said space-time window from said first data trace segment, or (B) if said degree of similarity is less than said predetermined threshold, accepting said first data trace segment without modification, and
      (iv) repeating steps (i) through (iii) for each data trace segment within said space-time window;
   (d) repeating step (c) for each space-time window; and
   (e) removing said horizontal alignment from said data traces.

2. The method of claim 1 wherein said preprocessing step comprises performing a moveout correction of said data traces using the seismic velocity of said coherent noise.

3. The method of claim 1 wherein said neighboring data trace segment is an adjacent data trace segment to said first data trace segment.

4. The method of claim 1 wherein said step of determining the degree of similarity between said first and second data trace segments comprises comparing phase, amplitude, and shape of said data trace segments.

5. The method of claim 1 wherein said step of determining the degree of similarity between said first and second data trace segments comprises performing a normalized, zero-lag cross correlation between said data trace segments.

6. The method of claim 5 wherein said normalized, zero-lag cross correlation is performed according to the following formula:

$$c_k = \frac{2 \sum_{t=t_1}^{t_2} z_j(t) z_{j+m}(t)}{\sum_{t=t_1}^{t_2} z_j^2(t) + \sum_{t=t_1}^{t_2} z_{j+m}^2(t)}$$

where $c_k$ is the normalized, zero-lag cross correlation value; $z_j(t)$ is the amplitude of said first data trace segment at time t; $z_{j+m}(t)$ is the amplitude of said second data trace segment at time t; m is an integer trace index used to identify said second data trace segment; and $t_1$ and $t_2$ are time values within said space-time window defining the time limits of said cross correlation.

7. The method of claim 1 wherein said first and second data trace segments are local but non-adjacent data trace segments.

8. The method of claim 1 wherein said set of seismic data traces comprises borehole seismic data.

9. The method of claim 1 wherein said set of seismic data traces comprises reflection seismic data.

10. A computer-implemented method for attenuating coherent noise in a set of seismic data traces, said method comprising the steps of:
   (a) determining the seismic velocity of said coherent noise and using said seismic velocity to moveout correct said data traces so as to substantially horizontally align said coherent noise;
   (b) dividing at least a portion of said data traces into a plurality of space-time windows containing segments of said data traces;
   (c) selecting a space-time window and performing a coherent noise attenuation procedure for said space-time window, said coherent noise attenuation procedure including the steps of
      (i) selecting a first data trace segment within said space-time window,
      (ii) performing a normalized, zero-lag cross correlation between said first data trace segment and a local but non-adjacent data trace segment within said space-time window,
      (iii) comparing the result of said normalized, zero-lag cross correlation to a predetermined correlation threshold and either
         (A) if said result is equal to or greater than said predetermined correlation threshold, modifying said first data trace segment by subtracting an adjacent data trace segment within said space-time window from said first data trace segment, or
         (B) if said result is less than said predetermined correlation threshold, accepting said first data trace segment without modification, and
      (iv) repeating steps (i) through (iii) for each data trace segment within said space-time window;
   (d) repeating step (c) for each space-time window; and
   (e) removing said moveout correction from said data traces.

11. The method of claim 10 wherein said normalized, zero-lag cross correlation is performed according to the following formula:

$$c_k = \frac{2 \sum_{t=t_1}^{t_2} z_j(t) z_{j+m}(t)}{\sum_{t=t_1}^{t_2} z_j^2(t) + \sum_{t=t_1}^{t_2} z_{j+m}^2(t)}$$

where $c_k$ is the normalized, zero-lag cross correlation value; $z_j(t)$ is the amplitude of said first data trace segment at time t; $z_{j+m}(t)$ is the amplitude of said local but non-adjacent data trace segment at time t; m is an integer trace index used to identify said local but non-adjacent data trace segment; and $t_1$ and $t_2$ are time values within said space-time window defining the time limits of said cross correlation.

12. A computer-implemented method for attenuating coherent noise in a set of seismic data traces, said method comprising the steps of:
   (a) substantially horizontally aligning said coherent noise;
   (b) dividing at least a portion of said data traces into a plurality of time windows containing segments of said data traces;
   (c) dividing each time window into a plurality of space-time windows;
   (d) selecting a space-time window and comparing characteristics of wavelets on two neighboring data trace segments within said space-time window to determine the degree of similarity of said wavelets;
   (e) comparing said degree of similarity to a predetermined threshold and either
      (i) if said degree of similarity is equal to or greater than said predetermined threshold, subtracting the wavelet from one data trace segment within said space-time window from the corresponding wavelet on a neighboring data trace segment within said space-time window, or
      (ii) if said degree of similarity is less than said predetermined threshold, doing no such subtraction,
   (f) repeating steps (d) and (e) for each space-time window;
   (g) repeating steps (c) through (f) for each time window; and
   (h) removing said horizontal alignment.

13. The method of claim 12 wherein said time windows are non-overlapping.

14. The method of claim 12 wherein said space-time windows are overlapping.

15. The method of claim 12 wherein said comparison of wavelet characteristics is between two local but non-adjacent data trace segments.

16. The method of claim 12 wherein said subtraction from a given data trace segment is from an adjacent data trace segment.

17. The method of claim 12 wherein said time windows are non-overlapping, said space-time windows are overlapping, said comparison of wavelet characteristics is between two local but non-adjacent data trace segments, and said subtraction from a given data trace segment is from an adjacent data trace segment.

18. The method of claim 12 wherein said comparison of wavelet characteristics comprises comparing phase, amplitude, and shape of said wavelets.

19. The method of claim 12 wherein said step of comparing characteristics of wavelets on two neighboring data trace segments comprises performing a normalized, zero-lag cross correlation between said neighboring data trace segments according to the following formula:

$$c_k = \frac{2 \sum_{t=t_1}^{t_2} z_j(t) z_{j+m}(t)}{\sum_{t=t_1}^{t_2} z_j^2(t) + \sum_{t=t_1}^{t_2} z_{j+m}^2(t)}$$

where $c_k$ is the normalized, zero-lag cross correlation value; $z_j(t)$ is the amplitude of one of said data trace segments at time t; $z_{j+m}(t)$ is the amplitude of the other data trace segment at time t; m is an integer trace index; and $t_1$ and $t_2$ are time values within said space-time window defining the time limits of said cross correlation.

20. A computer-implemented method for attenuating coherent noise in a set of seismic data traces, said method comprising the steps of:

(a) substantially horizontally aligning said coherent noise;
(b) dividing at least a portion of said data traces into a plurality of time windows containing segments of said data traces;
(c) dividing each time window into a plurality of space-time windows;
(d) selecting a space-time window and comparing characteristics of wavelets on two neighboring data trace segments within said space-time window to determine the degree of similarity of said wavelets;
(e) comparing said degree of similarity to a predetermined threshold and using a smoothing function to alter a wavelet from one data trace segment within said space-time window for the purpose of subtracting said altered wavelet from a corresponding wavelet on a neighboring data trace segment within said space-time window;
(f) repeating steps (d) and (e) for each space-time window;
(g) repeating steps (c) through (f) for each time window; and
(h) removing said horizontal alignment.

21. The method of claim 20 wherein said step of comparing characteristics of wavelets on two neighboring data trace segments comprises performing a normalized, zero-lag cross correlation between said neighboring data trace segments according to the following formula:

$$c_k = \frac{2 \sum_{t=t_1}^{t_2} z_j(t) z_{j+m}(t)}{\sum_{t=t_1}^{t_2} z_j^2(t) + \sum_{t=t_1}^{t_2} z_{j+m}^2(t)}$$

where $c_k$ is the normalized, zero-lag cross correlation value; $z_j(t)$ is the amplitude of one of said data trace segments at time t; $z_{j+m}(t)$ is the amplitude of the other data trace segment at time t; m is an integer trace index; and $t_1$ and $t_2$ are time values within said space-time window defining the time limits of said cross correlation.

22. The method of claim 21 wherein said smoothing function is as follows:

$$\tilde{\theta}(c_k) = \frac{1 + \tanh(a(c_k - c_T))}{2}$$

where $\theta(c_k)$ is said smoothing function; a is a nonnegative constant; $c_k$ is said normalized, zero-lag cross correlation value; and $c_T$ is said predetermined threshold.

* * * * *